United States Patent
Liang

(10) Patent No.: US 8,373,681 B2
(45) Date of Patent: Feb. 12, 2013

(54) STYLUS HAVING A RETRACTED AND EXTENDED POSITION

(75) Inventor: Shi-Xu Liang, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 263 days.

(21) Appl. No.: 12/795,820

(22) Filed: Jun. 8, 2010

(65) Prior Publication Data

US 2011/0139518 A1    Jun. 16, 2011

(30) Foreign Application Priority Data

Dec. 16, 2009   (CN) .......................... 2009 1 0311631

(51) Int. Cl.
*G06F 3/033* (2006.01)

(52) U.S. Cl. ........................................................ 345/179

(58) Field of Classification Search .................... 345/179
See application file for complete search history.

(56) References Cited

U.S. PATENT DOCUMENTS

| | | | |
|---|---|---|---|
| 2003/0122804 A1* | 7/2003 | Yamazaki et al. | 345/179 |
| 2003/0145442 A1* | 8/2003 | Hoshino | 24/663 |
| 2003/0184529 A1* | 10/2003 | Chien et al. | 345/179 |
| 2007/0024601 A1* | 2/2007 | Liu et al. | 345/179 |
| 2010/0302213 A1* | 12/2010 | Yeh | 345/179 |

* cited by examiner

*Primary Examiner* — Chanh Nguyen
*Assistant Examiner* — Long D Pham
(74) *Attorney, Agent, or Firm* — Altis Law Group, Inc.

(57) ABSTRACT

A stylus comprises a shell, a stylus body, and a slide enabling member. The shell has a chamber defined therethrough. The stylus body is slidably accommodated in the chamber of the shell. The slide enabling member is slidably coupling the stylus body to the shell so the stylus body can slide relative to the shell from a retracted position to an extended position. The slide enabling member includes a sliding pin located at one of the stylus body and the shell, and a track defined at another one of the stylus body and the shell and slidably engaging with the sliding pin so the stylus body slides relative to the shell.

13 Claims, 5 Drawing Sheets

US 8,373,681 B2

STYLUS HAVING A RETRACTED AND EXTENDED POSITION

BACKGROUND

1. Technical Field

This exemplary disclosure generally relates to writing implements, and particularly to retractable/extendable styluses.

2. Description of Related Art

It is well-known that a variety of devices include a touch screen. Examples of such devices include smart phones, personal digital assistants (PDA), pagers, personal organizers, and the like. These devices typically include a display module under the touch screen. The display module generates target images associated with menu options, programs, user choices, and other operations. The user controls the device by pressing the touch screen over the target image with a stylus. However, typical styluses can be inconvenient to retract or extend.

Therefore, there is room for improvement within the art

BRIEF DESCRIPTION OF THE DRAWINGS

Many aspects of the exemplary stylus can be better understood with reference to the following drawings. The components in the various drawings are not necessarily drawn to scale, the emphasis instead being placed upon clearly illustrating the principles of the exemplary stylus. Moreover, in the drawings, like reference numerals designate corresponding parts throughout the diagrams.

DETAILED DESCRIPTION

In this exemplary embodiment, the stylus is used to contact a touch screen display of an electronic device such as a mobile telephone. The mobile telephone described herein is a representation of the type of wireless communication device that may benefit from the exemplary embodiment. However, it is to be understood that the exemplary embodiment may be applied to any type of hand-held or portable device including, but not limited to, the following devices: radiotelephones, cordless phones, paging devices, personal digital assistants, portable computers, pen-based or keyboard-based handheld devices, remote control units, portable media players (such as an MP3 or DVD player) that have wireless communication capability and the like. Accordingly, any reference herein to the mobile telephone should also be considered to apply equally to other portable wireless electronic devices.

Figure 1:
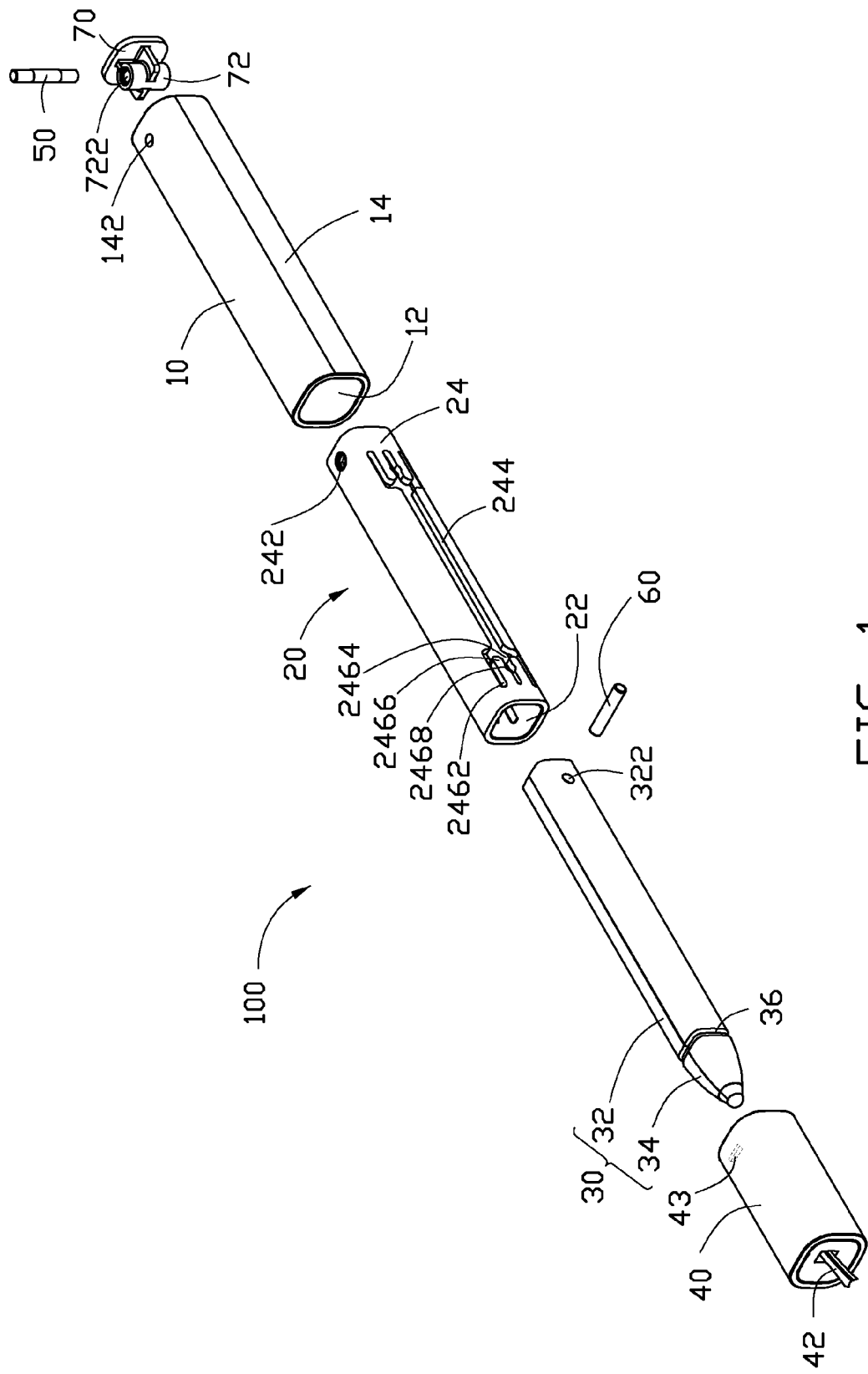
FIG. 1 is an exploded view of an exemplary stylus.
Figure 2:
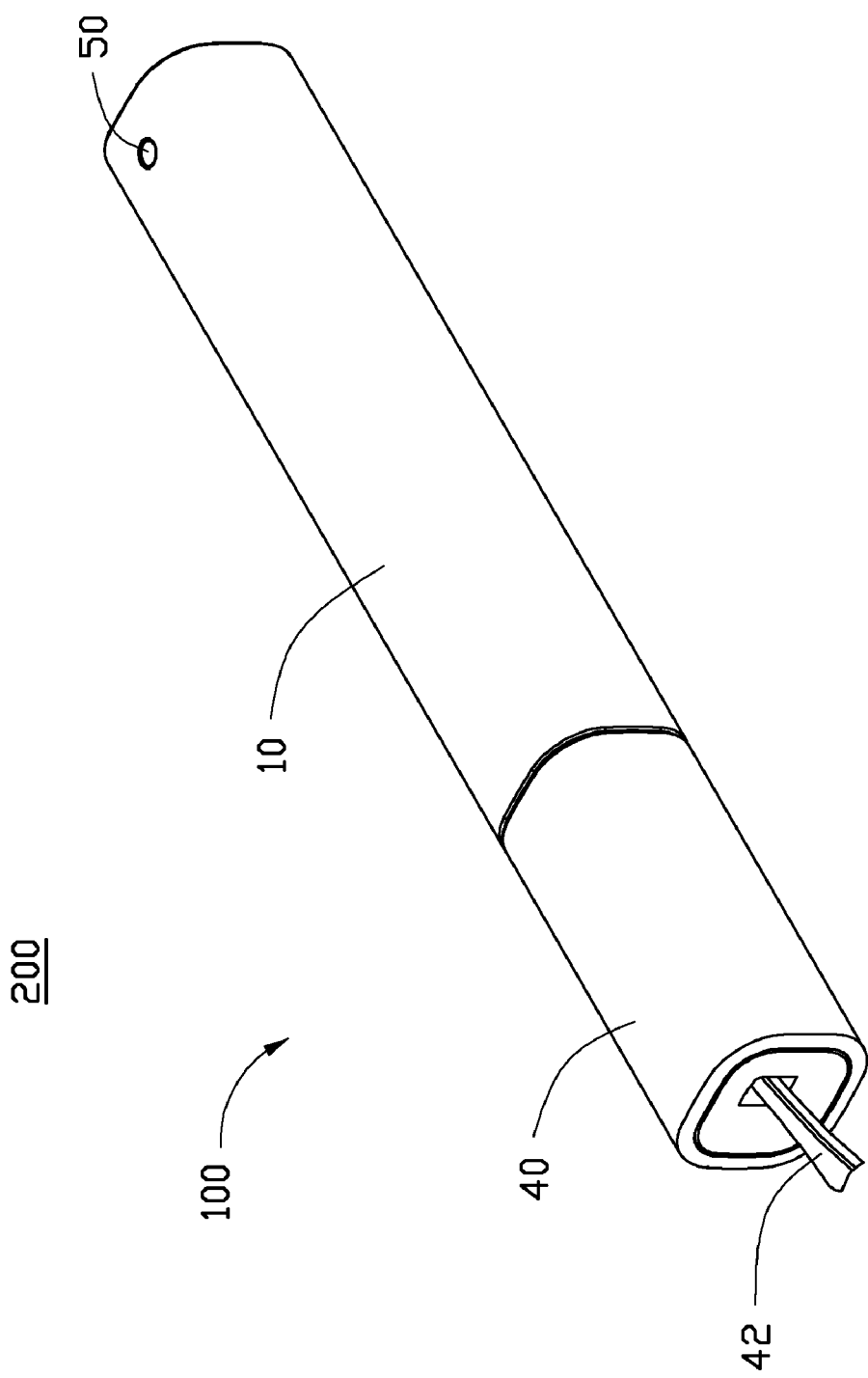
FIG. 2 is an assembled view of the stylus shown in FIG. 1.

Referring to FIGS. 1 and 2, a stylus 100 includes a housing 10, a shell 20, a stylus body 30, a cap 40 and a cover 70. The shell 20 is mounted to the housing 10 by a retaining pin 50, the stylus body 30 is slidably coupled to the shell 20 by a slide enabling member. In a retracted or closed position 200 shown in FIGS. 2, 3 and 5, the shell 20 is retracted in the housing 10 and the stylus body 30 is retracted in the shell 20 so the stylus 100 is shortened to improve the portability of the stylus 100. In an extended or open position 300 shown in FIG. 4, the stylus body 30 extends out of the shell 20 so the stylus 100 is lengthened to improve the convenience of using the stylus 100.

The housing 10 is tubular and of any suitable manufacture, and may for example be constructed of a lightweight metal such as stainless steel or aluminum alloy. The housing 10 is hollow, having a receptacle 12 defined longitudinally therethrough and two aligned first holes 142 defined at one end thereof.

The shell 20 is tubular and has generally the same shape as, but is slightly smaller than the receptacle 12 of the housing 10 so the shell 20 can be accommodated in the receptacle 12 of the housing 10. The shell 20 includes a chamber 22 defined therethrough and two aligned second holes 242 defined at one end thereof. When the shell 20 is accommodated in the receptacle 12 of the housing 10, the second holes 242 are aligned with the first toughs 142 and the retaining pin 50 is tightly fitted in the first holes 142 and the second holes 242 so the shell 20 is steadily accommodated in the receptacle 12 of the housing 10. The shell 20 is of any suitable manufacture, and may for example be constructed of a lightweight metal such as stainless steel or aluminum alloy.

Figure 3:
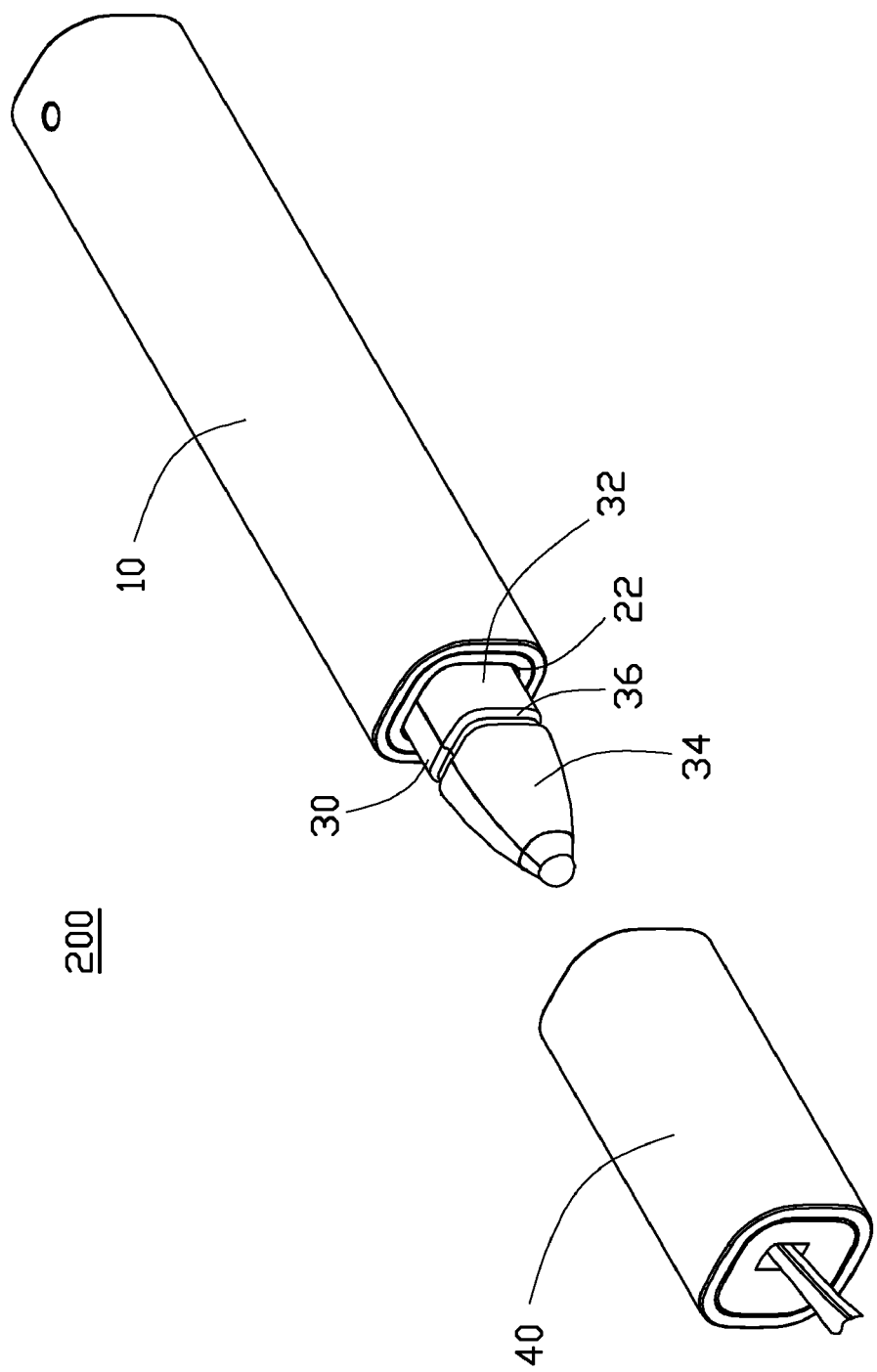
FIG. 3 is a schematic view of the stylus shown in FIG. 2, but a cap is removed from a stylus body.

The stylus body 30 be of any suitable manufacture, and may for example be constructed of a lightweight metal such as stainless steel or aluminum alloy. Referring to FIG. 3, the stylus body 30 is received within the chamber 22 of the shell 20 and partially extends out of the shell 20. The stylus body 30 is used to contact a touch screen display of an electronic device. The stylus body 30, in this embodiment, may include a body 32 and a head 34 protruding from one end of the body 32. The body 32 has generally the same shape as, but slightly smaller than, the chamber 22 of the shell 20, so the body 32 can be slidably fitted in the chamber 22. The stylus body 30 further includes a retaining slot 36 defined in an outer surface thereof between the body 32 and the head 34. The cap 40 has a protrusion 43 protruding from an inner surface thereof corresponding to the retaining slot 36. The protrusion 43 rests on the retaining slot 36 when the cap 40 covers the head 34, firmly holding the cap 40 on the head 34 to protect the head 34. The stylus body 30 further includes a retaining hole 322 defined adjacent to a distal end of the body 32 opposite to the head 34, and the function of the retaining hole 322 as discussed below.

Referring to FIGS. 1 and 3, the slide enabling member allows the stylus body 30 to slidably engage shell 20. The slide enabling member, in this embodiment, may include a sliding pin 60 and one or more tracks 244 engaging the sliding pin 60. The sliding pin 60 is positioned in the retaining hole 322 of the body 32 of the stylus body 30 and the track 244 can comprise two aligned guiding grooves respectively defined through opposite sidewalls of the shell 20. The sliding pin 60 is slid in the track 244 when the stylus body 30 slides relative to the shell 20. It is understood that one of ordinary skill in the art would appreciate the slide enabling member that comprises the sliding pin 60 and the track 244 only are one example. It is also understood that the sliding pin 60 may be carried on either the stylus body 30 or the shell 20 and the sliding pin 60 engaging members (e.g. track 244) may be carried on the element that the sliding pin 60 are not carried on.

The slide enabling member further includes two stopping holes 2468 that are located respectively at opposites ends of the track 244 and communicate with the track 244. The stopping holes 2468 are configured to hold the stylus body 30 in the retracted position 200 or the extended position 300. Each stopping hole 2468 communicates with the track 244 by a slit 2464 located between the stopping holes 2468 and the track 244. The stopping holes 2468 are sized and dimensioned to tightly fit the sliding pin 60 therein when the shell 20 is slid to the retracted position 200 shown in FIG. 5 and/or the extended position 300 shown in FIG. 4, and the slits 2464 are smaller than the sliding pin 60 so the sliding pin 60 can not freely slide out of the stopping holes 2468 when the sliding pin 60 is fit in the stopping holes 2468. Thus, the stylus body 30 can be firmly held in the refracted position 200 and the extended position 300 by the tight fit engagement between the stopping holes 2468 and the sliding pin 60.

The slide enabling member may include two U-shaped grooves 2462 respectively defined between each slit 2464 and the track 244. Each groove 2462 surrounds corresponding slit 2464 and the stopping hole 2468, so two opposite and parallel bending portions 2466 are formed between each groove 2462 and corresponding slit 2464 and stopping hole 2468. When the sliding pin 60 slides into the slits 2464 from the track 244, corresponding bending portions 2466 bend toward the groove 2462 to enlarge the slit 2464 so the sliding pin 60 can freely pass through the slit 2464 and enter into the stopping holes 2468. Once the sliding pin 60 is located in the stopping holes 2468, the bending portions 2466 bend toward the slit 2464 so the sliding pin 60 can not freely slide out of the stopping holes 2468 to hold the sliding pin 60 in the stopping holes 2468.

The stylus 100 may further includes a rope 42 positioned at a distal end of the cap 40. The rope 42 facilitates removal of the cap 40 from the stylus body 30. Additionally, the cover 70 includes a mounting portion 72 positioned at one side thereof for mounting the cover 70 on the housing 10. In this embodiment, the cover 70 has an opening 722 defined through the mounting portion 72. When the cover 70 is accommodated in the housing 10, the opening 722 is aligned with the first holes 142 and the second holes 242, and the center portion of the retaining pin 50 is inserted in the opening 722 so the cover 70 is steadily mounted in the housing 10.

Figure 4:
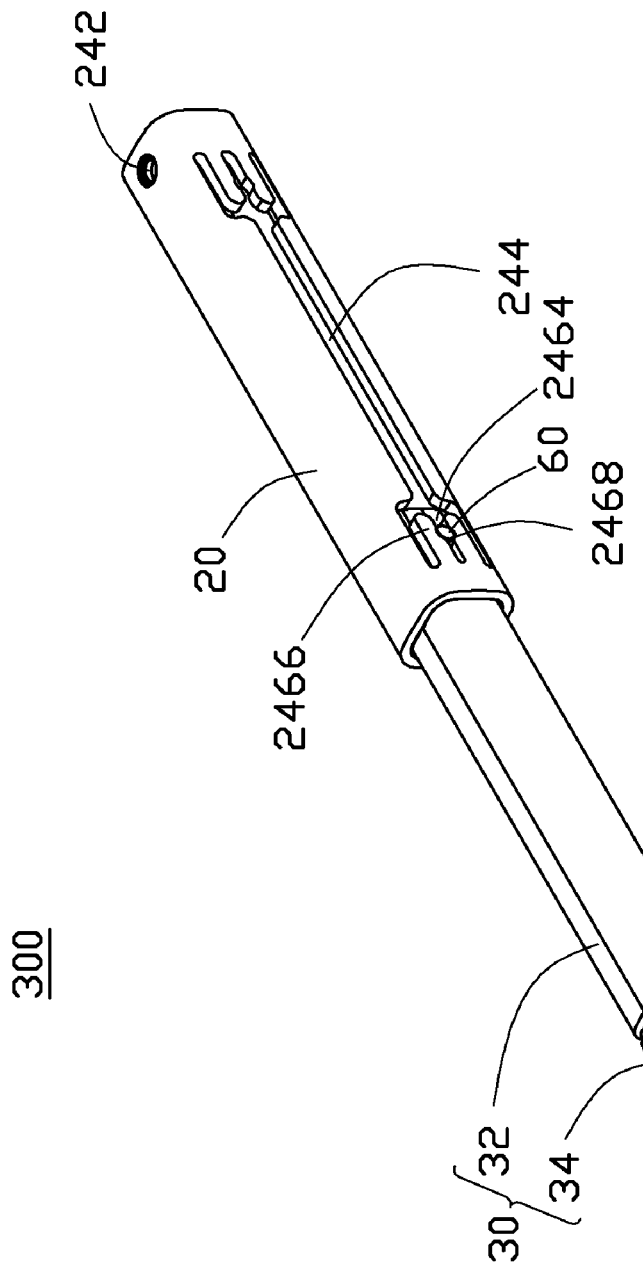
FIG. 4 is a schematic view of the stylus shown in FIG. 3, but a first shell is removed from a shell wherein the stylus is in a extended position.
Figure 5:
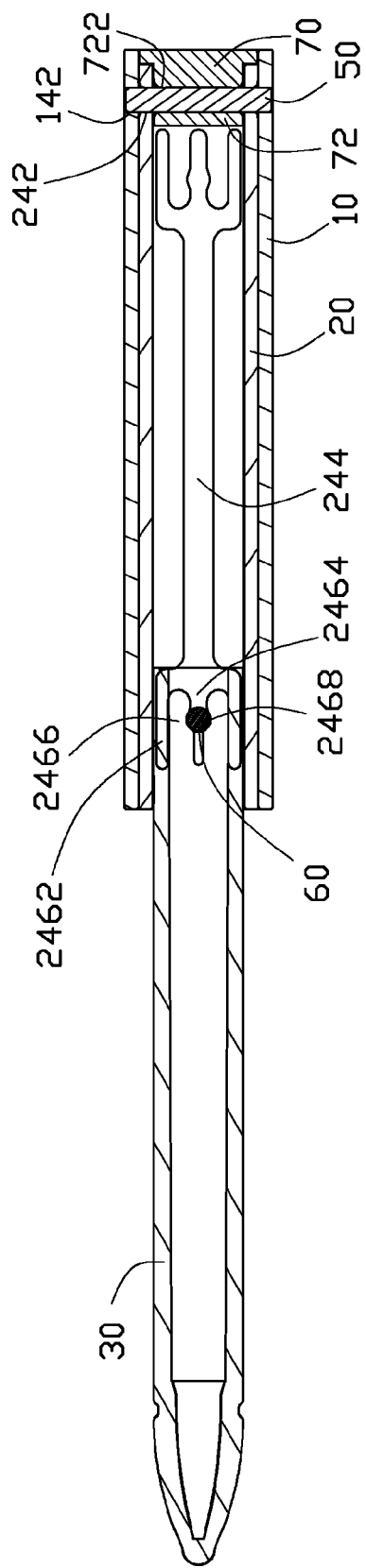
FIG. 5 is a cross-sectional view of the stylus in FIG. 2 along the line V-V, and wherein the stylus is in a close position.

Referring to FIGS. 1, 4 and 5, to assemble the stylus 100, the body 32 of the stylus body 30 is first inserted into the chamber 22 of the shell 20, the retaining hole 322 is aligned with one of stopping holes 2468 of the shell 20. The sliding pin 60 is then inserted into the stopping holes 2468 and the retaining hole 322, and the sliding pin 60 is tightly fitted in the retaining hole 322 so the sliding pin 60 is retained on the stylus body 30. The two ends of the sliding pin 60 are slidably accommodated in the stopping holes 2468 so the stylus body 30 is slidably mounted in the shell 20. The shell 20 is then inserted into the receptacle 12 of the housing 10 until the second holes 242 align with the first holes 142 of the housing 10. The cover 70 is inserted into the chamber 22 of the shell 20 and the opening 722 aligned with the second holes 242 and the first holes 142. The retaining pin 50 is then inserted into the first holes 142, the opening 722 and the second holes 242 so the housing 10, shell 20 and the cover 70 are assembled together. Finally the cap 40 is positioned on the head 34 to complete assembly of the stylus 100.

Referring to FIGS. 2 and 3, in operation, the cap 40 is pulled away from the housing 10, such as by using rope 42, until the protrusion 43 of the cap 40 is slid out of the retaining slot 36 of the stylus body 30. The head 34 of the stylus body 30 is then pulled away from the shell 20 until the sliding pin 60 slides out of the stopping hole 2468. The sliding pin 60 then slides in the track 244 of the shell 20 toward the other stopping hole 2468. Once the sliding pin 60 is positioned in the other stopping hole 2468, the stylus 100 is positioned in the extended position 200 shown in FIG. 4 so the stylus 100 is ready to use.

It is to be further understood that even though numerous characteristics and advantages of the exemplary embodiments have been set forth in the foregoing description, together with details of structures and functions of various embodiments, the disclosure is illustrative only, and changes may be made in detail, especially in matters of shape, size, and arrangement of parts within the principles of the exemplary invention to the full extent indicated by the broad general meaning of the terms in which the appended claims are expressed.

What is claimed is:

1. A stylus, comprising:
a shell having a chamber defined there through;
a stylus body slidably accommodated in the chamber of the shell; and
a slide enabling member slidably coupling the stylus body to the shell so the stylus body can slide relative to the shell from a retracted position to an extended position;
wherein the slide enabling member includes a sliding pin and a track slidably engaging with the sliding pin, the sliding pin is located in one of the stylus body and the shell, and the track is defined in the other of the stylus body and the shell; two opposite bending portions are formed at each of two ends of the track, and a stopping hole communicating with the track is defined between every two opposite bending portions; two slits are located between the track and the stopping holes, the slits are smaller than the sliding pin so the sliding pin cannot freely slide out of the stopping holes when the sliding pin is fit in the stopping holes; two U-shaped grooves are respectively defined between each slit and the track, each groove surrounds a corresponding slit and the stopping hole, so every two opposite bending portions are formed between each groove and a corresponding slit.

2. The stylus as claimed in claim 1, wherein the sliding pin is positioned on the stylus body and the track is positioned on the shell.

3. The stylus as claimed in claim 2, wherein the stopping holes are sized and dimensioned to tightly fit the sliding pin therein when the shell is slid to the retracted position or the extended position.

4. The stylus as claimed in claim 1, wherein when the sliding pin slides into the slits from the track, corresponding bending portions bend toward the groove to enlarge the slit so the sliding pin can freely pass through the slit and then enter into the stopping holes.

5. The stylus as claimed in claim 1, wherein the stylus further includes a housing, the housing has a receptacle defined longitudinally there through, the shell is accommodated in the receptacle.

6. The stylus as claimed in claim 5, wherein the housing further has two aligned first holes defined at one end thereof; the shell includes two aligned second holes defined at one end thereof; when the shell is accommodated in the receptacle of the housing, the second holes align with the first holes and a retaining pin is tightly fitted in the first holes and the second holes so the shell is steadily accommodated in the receptacle of the housing.

7. The stylus as claimed in claim 6, wherein the stylus further includes a cover, the cover includes a mounting portion positioned at one side thereof for mounting the cover on the housing.

8. The stylus as claimed in claim 7, wherein the cover has an opening defined through the mounting portion; when the cover is accommodated in the housing, the opening is aligned with the first holes and the second holes, and the center portion of the retaining pin is inserted in the opening so the cover is steadily mounted in the housing.

9. The stylus as claimed in claim 1, wherein the stylus further includes a cap releasably mounted to the stylus body; the cap has a rope positioned at a distal end thereof, the rope is configured to facilitate removing of the cap from the stylus body.

10. A stylus, comprising:

a shell; and a stylus body slidably accommodated in shell and being capable of extending out of the shell;

wherein the shell has a track defined along sliding direction of the stylus body; a sliding pin positioned in the stylus body and slidably engages with the track to make the stylus body slides relative to the shell; two opposite bending portions are formed at each of two ends of the track, and a stopping hole communicating with the track is defined between every two opposite bending portions; the stopping holes are sized and dimensioned to tightly fit the sliding pin therein when the shell is slid to the retracted position or the extended position; two slits are located between the track and the stopping holes, the slits are smaller than the sliding pin so the sliding pin cannot freely slide out of the stopping holes when the sliding pin is fit in the stopping holes; two U-shaped grooves are respectively defined between each slit and the track, each groove surrounds a corresponding slit and the stopping hole, so every two opposite bending portions are formed between each groove and a corresponding slit.

11. The stylus as claimed in claim 10, wherein when the sliding pin slides into the slits from the track, corresponding bending portions are bent toward the groove to enlarge the slit so the sliding pin can freely pass through the slit and then enter into the stopping holes.

12. The stylus as claimed in claim 10, wherein the stylus further includes a housing, the housing has a receptacle defined longitudinally there through, the shell is accommodated in the receptacle.

13. The stylus as claimed in claim 12, wherein the housing further has two aligned first holes defined at one end thereof; the shell includes two aligned second holes defined at one end thereof; when the shell is accommodated in the receptacle of the housing, the second holes are aligned with the first holes and a retaining pin is tightly fitted in the first holes and the second holes so the shell is steadily accommodated in the receptacle of the housing.

* * * * *